United States Patent
Garcia Sayes et al.

(10) Patent No.: US 9,382,901 B2
(45) Date of Patent: Jul. 5, 2016

(54) POWER CONTROL SYSTEM OF AN ELECTRICAL GENERATION UNIT

(71) Applicant: ACCIONA WINDPOWER, S.A., Sarriguren (ES)

(72) Inventors: Jose Miguel Garcia Sayes, Sarriguren (ES); Teresa Arlaban Gabeiras, Sarriguren (ES); Alfonso Ruiz Aldama, Sarriguren (ES); Alberto Garcia Barace, Sarriguren (ES); Ana Fernandez Garcia de Iturrospe, Sarriguren (ES); Diego Otamendi Claramunt, Sarriguren (ES); Alejandro Gonzalez Murua, Sarriguren (ES); Miguel Nunez Polo, Sarriguren (ES)

(73) Assignee: Acciona Windpower S.A., Navarra (ES)

( * ) Notice: Subject to any disclaimer, the term of this patent is extended or adjusted under 35 U.S.C. 154(b) by 0 days.

(21) Appl. No.: 14/448,947

(22) Filed: Jul. 31, 2014

(65) Prior Publication Data
US 2015/0035282 A1 Feb. 5, 2015

(30) Foreign Application Priority Data
Jul. 31, 2013 (ES) .................................. 201331197

(51) Int. Cl.
| | | |
|---|---|---|
| *F03D 9/00* | (2006.01) | |
| *H02P 9/04* | (2006.01) | |
| *F03D 7/02* | (2006.01) | |
| *F03D 7/04* | (2006.01) | |
| *H02P 9/00* | (2006.01) | |

(52) U.S. Cl.
CPC .............. *F03D 9/005* (2013.01); *F03D 7/0224* (2013.01); *F03D 7/042* (2013.01); *H02P 9/00* (2013.01)

(58) Field of Classification Search
USPC ...................................... 290/44, 55
See application file for complete search history.

(56) References Cited

U.S. PATENT DOCUMENTS

| | | | | |
|---|---|---|---|---|
| 5,353,372 | A * | 10/1994 | Cook ....................... | G10L 25/90 704/207 |
| 6,420,795 | B1 | 7/2002 | Mikhail et al. | |
| 7,602,075 | B2 * | 10/2009 | Erdman ................ | F03D 7/0224 290/40 R |
| 8,520,766 | B2 * | 8/2013 | Kitamura .............. | H03F 1/0227 375/259 |
| 2006/0273595 | A1 | 12/2006 | Avagliano et al. | |
| 2008/0030027 | A1 * | 2/2008 | Erdman ................ | F03D 7/0224 290/40 R |
| 2012/0250747 | A1 * | 10/2012 | Kitamura .............. | H03F 1/0227 375/224 |
| 2014/0197885 | A1 * | 7/2014 | Fudaba ................. | H03F 1/3247 330/149 |
| 2015/0035282 | A1 * | 2/2015 | Garcia Sayes ........ | F03D 7/0224 290/44 |

FOREIGN PATENT DOCUMENTS

EP      2 336 558 A2    6/2011

OTHER PUBLICATIONS

Extended European Search Report for counterpart application No. EP14175194.1-1806, 6 pgs. (Jun. 29, 2015).

(Continued)

*Primary Examiner* — Pedro J Cuevas
(74) *Attorney, Agent, or Firm* — Blakely, Sokoloff, Taylor & Zafman LLP

(57) ABSTRACT

The present invention can be included in the technical field of power control systems of electrical generation units comprising a supervisory regulation link applicable to a generation unit which calculates operating parameters or orders based on temporary averages of the power measurement.

20 Claims, 2 Drawing Sheets

(56) References Cited

OTHER PUBLICATIONS

Alka Singh, et al., "Performance and Control of Converter Interfaced Distribution Resources," Power Electronics (IICPE), 2010 India International Conference on XP031929707, pp. 1-6 (Jan. 28, 2011).

Alka Singh, et al., "Multifunctional Capabilities of Converter interfaced Distributed Resource in Grid Connected Mode," Power Electronics (IICPE), 2012 IEEE 5$^{th}$ India international Conference on, XP032326036, pp. 1-6 (Dec. 6, 2012).

Tan Luong Van: et al., "Output Power Smoothening of Variable-Speed Wind Turbine Systems by Pitch Angle Control," IPEC, 2012 Conference on Power & Energy, XP032422357, pp. 166-171 (Dec. 12, 2012).

G.K. Venayagarnoonhy, et al., "SmartPark Shock Absorbers for Wind Farms," IEEE Transactions of Energy Conversion, XP011381079, vol. 26, No. 3. pp. 990-992 (Sep. 1, 2011).

\* cited by examiner

POWER CONTROL SYSTEM OF AN ELECTRICAL GENERATION UNIT

FIELD OF THE INVENTION

The present invention can be included in the technical field of power control systems of electrical generation units.

The object of the invention is a power control system of an electrical generation unit, and more specifically of a wind turbine or of a wind farm, comprising a supervisory regulation link applicable to a generation unit which calculates operating parameters or orders based on temporary averages of the power measurement.

BACKGROUND OF THE INVENTION

Wind turbines today incorporate control systems whose objective is to maximise energy production by a solution of compromise, which guarantees that the loads associated to the wind are maintained within a range that can be assumed by the component design. It is for this reason that the control over the torque demanded of the generator to operate at variable speed and the control of the blade pitch angle have become conventional control systems.

On the one hand, the control of the blade pitch angle is controlled by actuators disposed in the root of each blade, which makes the blade rotate around its longitudinal axis. Said actuation manages to vary the aerodynamic behaviour of the blade modifying the pitch of the blade to maintain the rotational speed at approximately the rated rotational speed once the rated torque has been reached.

On the other hand, the control system over the demanded torque modulates said demanded torque to the generator from the converter in accordance with the generator speed.

In this way, variable-speed wind turbines operate by maximizing the aerodynamic performance in a low-wind basis thanks to its capacity for working at variable rotor rotational speed, where their rotational speed is controlled by modulating the torque in the electrical generator in a determined medium and high-wind regime limit the rotational speed of the rotor in the event of gusts thanks to the control of the blade pitch angle, managing to limit the power generated in a value substantially equal to the rated power.

Generally, the wind turbine regulation loops calculate orders in working cycles whose calculation period is less than a second, with the aim of achieving great response agility. Thus, document U.S. Pat. No. 6,420,795B2 presents a torque control system such as those described above.

Said control system may involve an energy loss with respect to that which may be produced on many occasions due to the fact that said regulation loops incorporate limiters which, in each calculation step, prevent the power or the torque from exceeding their respective maximum value at any time.

To resolve said problem, there are proposals which include two regulation types: a regulation such as the conventional one, with the different speed control bands typical of variable-speed wind turbines, and an alternative regulation used in certain periods of time, wherein a higher value than the rated value of the conventional regulation loop is used as power limit, as a channel for the compensation of previous energy losses which may be due to situations wherein there was no wind available to reach the rated power.

Among the above we have document EP2336558A2 relating to control method of wind turbines comprising control means for a standard regulation tracking a power vs. generator speed curve of the generator, comprising a first sub-nominal zone wherein the generator speed is kept constant at its coupling value, a second sub-nominal zone wherein it allows that both the speed of the generator and the power increase or decrease in line with the wind speed, a third sub-nominal zone wherein the wind speed is kept constant at its nominal value and a nominal zone wherein the power is kept constant at its nominal value, where during certain periods of time an alternative regulation is used at a power higher than that determined by the standard regulation to optimise the energy production compensating for previous losses.

Patent application US2006273595A1 is also known relating to a system and method to operate a wind farm under high wind conditions, where the method performs an intermittent increase in the rated power output of the wind turbine based on an estimate of a set of operating parameters with respect to the design conditions of said operation parameters.

Likewise, in wind farm control loops which send rated power limitation orders, to stop below the order values, higher rated limits are applied to fast-acting or instantaneous regulation loops, with calculation cycles for the torque orders in the range of 10-100 ms and of the pitch orders in the range of 100-200 ms and the regulation loops are performed based on instantaneous measurements, so that the production can be extra-limited.

SUMMARY OF THE INVENTION

The present invention resolves the technical problem posed, using a power control system of an electrical generation unit comprising regulation means of the instantaneous power generated $P_{inst}$, means for determining a signal indicative of the instantaneous power generated and means for determining, from the signal indicative of the instantaneous power generated $P_{inst}$ in a time interval, an average power signal generated $\overline{P}_{avg}$.

Throughout the present specification, whenever use is made of the term power, whether instantaneous or average, as a general rule reference is being made to real power. To make reference to another type of power, such as apparent or reactive, throughout the specification, the terms apparent power and reactive power shall be used respectively.

The control system further comprises average power regulation means configured to modify an operating parameter $X_{ref}$ of the regulation means of the instantaneous power generated in accordance with the error between an average reference power signal $\overline{P}_{ref}$ which may be the rated power of the generation unit, and the average power signal generated $\overline{P}_{avg}$, so that said error is eliminated.

To calculate the average power $\overline{P}_{avg}$ the historical values of the instantaneous power signal generated $P_{inst}$ are considered during a time interval. Said time interval can either be configurable or predetermined, for example, equal to ten minutes.

The average power regulation means thus configured allow that the instantaneous limits can temporarily exceed the stationary limit as long as they are not exceeded as a general rule. Due to the fact that the stationary limits are normally thermal or of loads, it guarantees that they are not exceeded nor are the components thermally or mechanically overloaded, whilst, in turn, the generation periods below the rated stationary limits, which are of shorter duration than the time interval configurable by the average power regulation means, are compensated by others also of shorter duration than the configurable time interval, wherein the power is greater than the normal stationary limits.

In this way, the average power regulation means of the system of the present invention carry out a continuous control, where due to this compensation of the generation periods below the rated stationary limits, said compensation maximizes the energy produced by the installation whilst it guarantees the integrity of its components.

The operating parameter of the regulation means of the instantaneous power generated which is modified by the average power regulation means of the system of the present invention may be, but is not limited to, one of the following: maximum instantaneous power $P_{max\_inst}$, reference rotational speed, reference pitch angle, increase in power or torque over the reference power or reference torque respectively calculated in an instantaneous regulation loop.

Optionally, the electrical generation unit is a wind turbine comprising a rotor formed by at least two blades and an electrical generator connected to said rotor and to the grid, where the regulation means of the instantaneous power comprises control means of the electrical torque of the generator and/or control means of blade pitch.

Also optionally, the generation unit is a wind farm comprising wind turbines and where the operating parameter $X_{ref}$ of the regulation means of the instantaneous power generated $P_{inst}$ is an average power reference $\overline{P}_{ref\_i}$ for the wind turbines of the wind farm.

Optionally, the regulation means of the instantaneous power generated perform the calculation of a overall average power $\overline{P}_{avg\_Global}$ based on the measurement of overall instantaneous power $P_{inst\_Global}$, and in accordance with the error between said overall average power $\overline{P}_{avg\_Global}$ and the average reference power $\overline{P}_{ref\_Global}$, which may be received from a remote control station of the customer or directly from the grid operator or be an average power reference equal to the rated power of the wind farm, calculates the parameter of average power reference $\overline{P}_{ref\_i}$ for the wind turbines of the wind farm, and can perform the central control of a wind farm from a substation.

BRIEF DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented.

DETAILED DESCRIPTION

A detailed description of the preferred embodiment of the invention is described below with the aid of FIGS. 1 to 5 mentioned above.

The power control system of an electrical generation unit comprising regulation means (2) of the instantaneous power generated $P_{inst}$ (3), means for determining a signal indicative of the instantaneous power generated and means (4) for determining an average power signal generated $\overline{P}_{avg}$ (5) from the signal indicative of the instantaneous power generated $P_{inst}$ (3), considers the historical signal values of instantaneous power generated $P_{inst}$ (3) during a time interval (21), being calculated in this example of preferred embodiment in accordance with the following formula:

$$\overline{P}_{avg} = \int_{t_0}^{t_1} P_{inst} dt$$

The control system further comprises average power regulation means (6) configured to modify an operating parameter $X_{ref}$(7) of the regulation means (2) of the instantaneous power generated $P_{inst}$ (³), in accordance with the error between an average reference power signal $\overline{P}_{ref}$ (17), and the average power signal generated $\overline{P}_{avg}$ (5).

Figure 1:
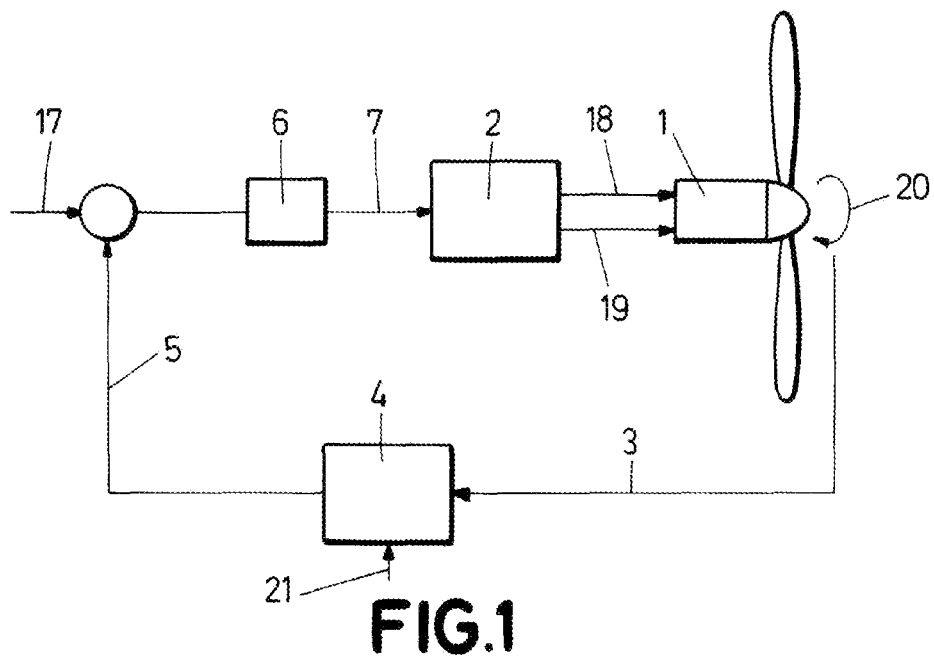
FIG. 1.—Shows a diagram of the average power regulation means of the power control system of an electrical generation unit of the present invention, FIG. 2.—Shows a graphic of the evolution of the instantaneous power and of the average power based on the evolution of the measurement of average power with respect to the average reference power and the operating parameter of the regulation means of the instantaneous power generated $P_{inst}$, FIG. 3.—Shows a diagram of preferred embodiment of the invention where the generation unit is formed by a wind farm.
Figure 2:
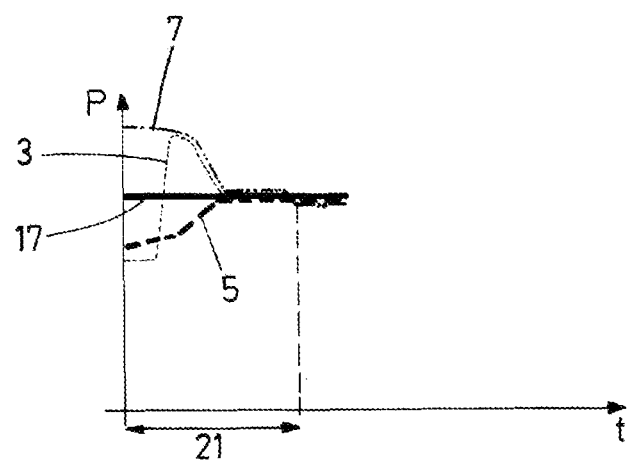
Figure 3:
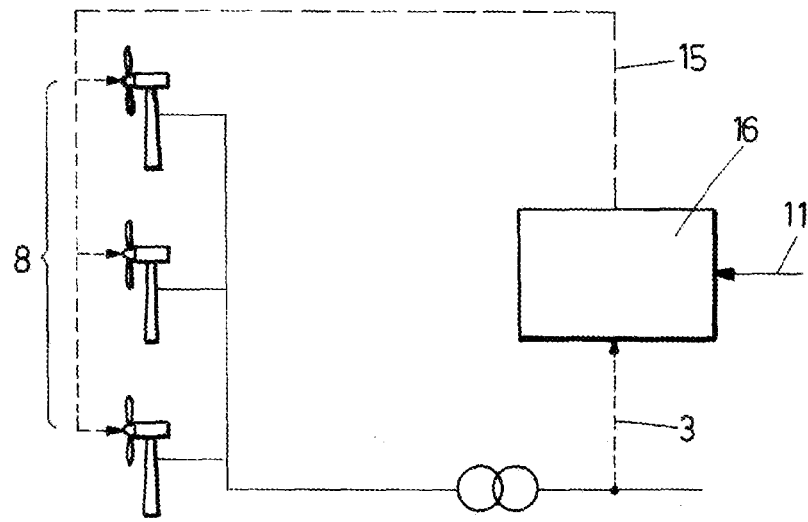
Figure 4:
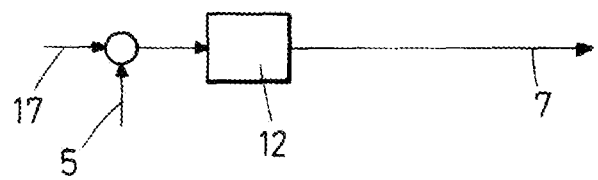
FIG. 4.—Shows a diagram of the system of the present invention where the average power regulation means is a proportional-integral regulator.
Figure 5:
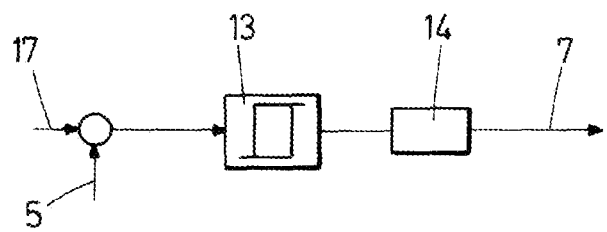
FIG. 5.—Shows a diagram of the system of the present invention where the average power regulation means are discontinuous, e.g. a hysteresis cycle.

FIG. 2 shows an example of the operation of the control system proposed for a wind turbine in an interval $\Delta t$ equal to that used to calculate the average power generated $\overline{P}_{avg}$ (5). In this case, the average power regulation means (6) calculate a maximum value of instantaneous power $P_{max\_inst}$ in accordance with the error between the average reference power $\overline{P}_{ref}$ (17) and the average power generated $\overline{P}_{avg}$ (5) based on the instantaneous power generated $P_{inst}$ (3). In the case shown, in the first part of the interval, the average power generated $\overline{P}_{avg}$ (5) is less than the average reference power $\overline{P}_{ref}$ (17), and, therefore, the average power regulation means (6) calculate the operating parameter $X_{ref}$(7), which in this example is the maximum instantaneous power $P_{max\_inst}$, greater than the average reference power $\overline{P}_{ref}$(17).

Said average reference power $\overline{P}_{ref}$(17), as stated, can be the rated real power of the wind turbine or a value greater than it such as, for example, a rated value of apparent power of the wind turbine. In the case that the grid integration requirements give priority to reactive power generation to contribute to the control of the grid voltage against the generation of real power, the average reference power $\overline{P}_{ref}$(17) is calculated as the difference between the rated apparent power and the average reactive power in said time interval (21).

The operating parameter $X_{ref}$(7) of the regulation means of the instantaneous power generated $\overline{P}_{inst}$(3), which is modified by the average power regulation means (6) of the system of the present invention can be, but is not limited to, one of the following: maximum instantaneous power $P_{max\_inst}$, maximum instantaneous torque, reference rotational speed, reference pitch angle (18), increase in power or torque over the reference power or reference torque (19) respectively calculated in a instantaneous regulation loop.

Preferably, the operating parameter $X_{ref}$(7) is a maximum limit of instantaneous power wherefrom, for a constant rotational speed, it calculates a maximum torque limit which is applied in the speed control loop with torque. In this case, the speed control with pitch is synchronized to not be activated until the new maximum torque limit is reached.

Also preferably, the operating parameter $X_{ref}$(7) is a maximum limit of instantaneous power wherefrom, for a maximum constant torque limit a new rotational speed reference (20) is calculated, which is applied in the speed control loop with torque and pitch.

The generation unit is preferably a wind turbine, comprising a rotor formed by at least two blades and an electrical generator (1) connected to said rotor and to the grid, where the regulation means of the instantaneous power generated $P_{inst}$ (3) comprises control means of the electrical torque of the generator and/or control means of blade pitch.

In another example of preferred embodiment, the generation unit is a wind farm (8) comprising wind turbines and where the operating parameter $X_{ref}$ (7) of the regulation means (2) of the instantaneous power generated $P_{inst}$ (3) is an average power reference $\overline{P}_{ref\_i}$ (15) for the wind turbines of the wind farm (8).

The regulation means (2) of the instantaneous power generated $P_{inst}$ (3) perform the calculation of an overall average power $\overline{P}_{avg\_Global}$ (9) based on the measurement of overall instantaneous power $\overline{P}_{inst\_Global}$ (10), and in accordance with the error between said overall average power $\overline{P}_{avg\_Global}$ (9) and an average reference power $\overline{P}_{ref\_Global}$ (11), which may be received from a remote control station of the customer operator or the operator's grid or be an average reference power $\overline{P}_{ref\_Global}$ (11) equal to the rated power of the wind farm, it calculates the parameter of average power reference $\overline{P}_{ref\_i}$ (15) for the wind turbines of the wind farm, and can perform the central control of a wind farm from a substation (16).

In an example of embodiment, as average reference power signal $\overline{P}_{ref}$ (17), the average power regulation means (6) can temporarily use a value greater than that of the rated power of the wind turbine which optionally may come from an order received from the wind farm control.

In another example of embodiment, as average reference power signal $\overline{P}_{ref}$ (17), the average power regulation means (6) can temporarily use a value less than that of the rated power of the wind turbine which optionally may come from an order received from the wind farm control.

When the average reference power signal $\overline{P}_{ref}$ (17), is greater, it makes it possible to compensate for losses in the wind farm, due to, for example, the stoppage of one of the farm machines or the electrical losses that take place therein.

When it is lower, the power can be limited, for example, due to limitations because of saturation of electrical transmission lines, also using average power measurements and even making it possible to compensate with that limit shorter generation periods. As these limitations generally respond to line overloads, also limited by thermal phenomena, said limit can be instantaneously limited without causing any damage.

Preferably, the regulation means (6) of the average power used to calculate the operating parameter (7) can be of continuous type comprising, for example, a proportional-integral regulator (12), which enables performing a gentler regulation using intermediate values, which reduces the cycling and is more advantageous from a thermal standpoint.

Also preferably, the regulation means (6) of the average power used to calculate the operating parameter (7) can be of discontinuous type, comprising a hysteresis cycle (13) or switch which selects between two values of the operating parameter (7) in accordance with the comparison between the average reference power $\overline{P}_{ref}$ (17), and the average power generated $\overline{P}_{avg}$ (5). Furthermore, a ramp block (14) is incorporated to ease the transitions between the two values of the operating parameter (7).

More preferably, the regulation means (6) of the average power used to calculate the operating parameter (7) further comprise a limiter block, where the maximum value used for the limitation takes into consideration instantaneous limits of real power, reactive power, voltage, temperature, overloads, etc. This makes it possible to consider instantaneous limits of the wind turbine or wind farm components.

What is claimed is:

1. Power control system of an electrical generation unit comprising regulation means of the instantaneous power generated $P_{inst}$, means for determining a signal indicative of the instantaneous power generated and means for determining, from the signal indicative of the instantaneous power generated $P_{inst}$ in a time interval, an average power signal generated $\overline{P}_{avg}$, further comprising average power regulation means configured to modify an operating parameter $X_{ref}$ of the regulation means of the instantaneous power generated $P_{inst}$ in accordance with the error between an average reference power signal $\overline{P}_{ref}$, and the average power signal generated $\overline{P}_{avg}$.

2. The system of claim 1, wherein the generation unit is a wind turbine comprising a rotor formed by at least two blades and an electrical generator connected to said rotor and to the grid, where the regulation means of the instantaneous power generated $P_{inst}$ comprises control means of the electrical torque of the generator and/or control means of blade pitch.

3. The system of claim 1, wherein the generation unit is a wind farm comprising wind turbines and where the operating parameter $X_{ref}$ of the regulation means of the instantaneous power generated $P_{inst}$ is an average power reference $\overline{P}_{ref\_i}$ for the wind turbines of the wind farm.

4. The system of claim 1, wherein the average reference power signal $\overline{P}_{ref}$ is the rated power of the generation unit.

5. The system of claim 3, wherein the average reference power signal $\overline{P}_{ref}$ is a value greater than that of the rated power of the wind turbine used temporarily.

6. The system of claim 3 wherein the average reference power signal $\overline{P}_{ref}$ is a value less than that of the rated power of the wind turbine used temporarily.

7. The system claim 5, wherein the value of the average reference power signal $\overline{P}_{ref}$ is obtained from an order received from the wind farm control.

8. The system of claim 1, wherein the average reference power signal $\overline{P}_{ref}$ is the difference between the rated apparent power and the average reactive power in the time interval.

9. The system of claim 1, wherein the regulation means of the average power used to calculate the operating parameter are of continuous type comprising a proportional-integral regulator.

10. The system of claim 1, wherein the regulation means of the average power used to calculate the operating parameter are of discontinuous type, comprising a hysteresis cycle or switch which selects between two values of the operating parameter in accordance with the comparison between the average reference power $\overline{P}_{ref}$, and the average power generated $\overline{P}_{avg}$.

11. The system of claim 10, further comprising a ramp block.

12. The system of claim 9, wherein the regulation means of the average power used to calculate the operating parameter further comprise a limiter block.

13. The system of claim 1, wherein the operating parameter of the regulation means of the instantaneous power generated which is modified by the average power regulation means is one of the following:
maximum instantaneous power $P_{max-inst}$, reference rotational speed, reference pitch angle, increase in power or torque over the reference power or reference torque respectively calculated in an instantaneous regulation loop.

14. The system of claim 13, wherein the operating parameter $X_{ref}$ is the maximum instantaneous power $P_{max-inst}$, wherefrom, for a constant rotational speed reference, a maximum torque limit is calculated which is appiied in the speed control loop with torque.

15. The system of claim 13, wherein the operating parameter $X_{ref}$ is the maximum instantaneous power $P_{max-inst}$, wherefrom, for a maximum constant torque limit a new rotational speed reference is calculated, which is applied in the speed control loop with torque and pitch.

16. The system of claim 1, wherein the time interval wherein the error is calculated between the average reference power signal $\overline{P}_{ref}$, and the average power signed generated $\overline{P}_{avg}$ is a time interval predetermined or configurable by the system.

17. The system of claim 2 wherein the generation unit is a wind farm comprising wind turbines and where the operating parameter $X_{ref}$ of the regulation means of the instantaneous power generated $P_{inst}$ is an average power reference $\overline{P}_{ref\_1}$ for the wind turbines of the wind farm.

18. The system of claim 17 wherein the average reference power signal $\overline{P}_{ref}$ is a value greater than that of the rated power of the wind turbine used temporarily.

19. The system of claim 17 wherein the average reference power signal $\overline{P}_{ref}$ is a value less than that of the rated power of the wind turbine used temporarily.

20. The system of claim 6 wherein the value of the average reference power signal $\overline{P}_{ref}$ is obtained from an order received from the wind farm control.

* * * * *